(12) United States Patent
Suese (10) Patent No.: US 8,964,229 B2
(45) Date of Patent: Feb. 24, 2015

(54) DATA TRANSMITTING DEVICE AND IMAGE FORMING APPARATUS WHICH PROCESS AND TRANSMIT DATA ACCORDING TO COMMAND INFORMATION AND DESTINATION ADDRESS IDENTIFIED FROM SYMBOL SEQUENCE INPUTTED AT THE TIME OF THE TRANSMISSION

(71) Applicant: KYOCERA Document Solutions Inc., Osaka (JP)

(72) Inventor: Narihiko Suese, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/951,980

(22) Filed: Jul. 26, 2013

(65) Prior Publication Data

US 2014/0029053 A1      Jan. 30, 2014

(30) Foreign Application Priority Data

Jul. 27, 2012    (JP) ................................ 2012-167008

(51) Int. Cl.
```
G06F 3/12      (2006.01)
H04N 1/00      (2006.01)
H04N 1/32      (2006.01)
```
(52) U.S. Cl.
CPC ....... *H04N 1/00395* (2013.01); *H04N 1/00432* (2013.01); *H04N 1/0048* (2013.01); *H04N 1/00482* (2013.01); *H04N 1/32048* (2013.01); *H04N 2201/0094* (2013.01)
USPC ............ 358/1.15; 358/1.1; 719/320; 715/762

(58) Field of Classification Search
CPC .................................................. H04N 1/00228
See application file for complete search history.

(56) References Cited

U.S. PATENT DOCUMENTS 6,144,992 A * 11/2000 Turpin et al. .................. 709/208
6,279,123 B1 * 8/2001 Mulrooney ..................... 714/35
(Continued)

FOREIGN PATENT DOCUMENTS

JP      9-321791 A      12/1997
JP   2003-288182 A    10/2003
(Continued)

OTHER PUBLICATIONS

English Abstract and Translation for JP 2006-119176 A, published May 11, 2006.

(Continued)

*Primary Examiner* — Paul F Payer
(74) *Attorney, Agent, or Firm* — NDQ&M Watchstone LLP (57) ABSTRACT

A data transmission device includes: a communication portion that performs a transmission job which transmits data; an input portion that receives, at the time of performance of the transmission job, an input of a symbol sequence obtained by adding command information to a transmission destination address; and a processing portion that identifies a portion indicating the transmission destination address of and a portion indicating the command information of the symbol sequence input at the time of performance of the transmission job, that changes a setting value on the transmission job according to the command information and that makes the communication portion transmit data to a transmission destination corresponding to the transmission destination address.

7 Claims, 6 Drawing Sheets

(56) References Cited

U.S. PATENT DOCUMENTS

| | | | |
|---|---|---|---|
| 7,620,959 B2 * | 11/2009 | Snover et al. | 719/320 |
| 2006/0012835 A1 | 1/2006 | Shimizu | |
| 2014/0016163 A1 | 1/2014 | Shimizu | |

FOREIGN PATENT DOCUMENTS

| | | |
|---|---|---|
| JP | 2003-324577 A | 11/2003 |
| JP | 2004-40215 A | 2/2004 |
| JP | 2005-227810 A | 8/2005 |
| JP | 2006-31465 A | 2/2006 |
| JP | 2006-119176 A | 5/2006 |
| JP | 2009-278330 A | 11/2009 |

OTHER PUBLICATIONS

English Abstract and Machine Translation for JP-A-2003-288182, published Oct. 10, 2003.

English Abstract and Machine Translation for JP-A-2005-227810, published Aug. 25, 2005.

English Abstract and Machine Translation for JP-A-9-321791, published Dec. 12, 1997.

English Abstract and Machine Translation for JP-A-2003-324577, published Nov. 14, 2003.

English Abstract and Machine Translation for JP-A-2009-278330, published Nov. 26, 2009.

English Abstract and Machine Translation for JP-A-2004-40215, published Feb. 5, 2004.

* cited by examiner

DATA TRANSMITTING DEVICE AND IMAGE FORMING APPARATUS WHICH PROCESS AND TRANSMIT DATA ACCORDING TO COMMAND INFORMATION AND DESTINATION ADDRESS IDENTIFIED FROM SYMBOL SEQUENCE INPUTTED AT THE TIME OF THE TRANSMISSION

This application is based upon and claims the benefit of priority from the corresponding Japanese Patent Application No. 2012-167008 filed on Jul. 27, 2012, the entire contents of which are incorporated herein by reference.

BACKGROUND

The present disclosure relates to a data transmission device and an image forming apparatus including such a data transmission device.

Conventionally, an image forming apparatus (an image forming apparatus including a data transmission device) is known that can perform not only a printing job but also a transmission job of transmitting data to a specified transmission destination. The image forming apparatus described above includes, for example, an image reading portion that generates image data by optically reading an original document, and can transmit the image data obtained through the reading by the image reading portion to the specified transmission destination.

Incidentally, there are a large number of setting items in which, when the transmission job is performed, setting values can be changed. Hence, in the image forming apparatus that can perform the transmission job, an operation panel for receiving, from a user, an instruction to change the setting value on the transmission job is generally provided.

For example, the operation panel receives an input of a transmission destination address when the transmission job is performed. Here, the operation panel displays an address input screen for inputting the transmission destination address. In this way, the user inputs the transmission destination address, and thereby can specify the transmission destination. Then, when the change of the setting value on the transmission job is received at the time of performance of the transmission job, the operation panel displays a setting value input screen (a screen different from the address input screen) for inputting the setting value.

As described above, if the address input screen is different from the setting value input screen, when the setting value on the transmission job is changed, it is necessary to switch a display screen to the setting value input screen. Specifically, the user who wants to change the setting value when the transmission job is performed needs to look for a hard key or a soft key for switching the display screen to the setting value input screen and to perform an operation of switching the display screen to the setting value input screen. Hence, when the setting value on the transmission job is changed, a large number of operations need to be performed before a desired setting value is input, and this is inconvenient for the user.

SUMMARY

The present disclosure is made to solve the foregoing problem; an object of the present disclosure is to provide a data transmission device that can enhance the convenience of a user by simplifying an operation of changing a setting value on a transmission job and an image forming apparatus including such a data transmission device.

To achieve the above object, a data transmission device of the present disclosure includes a communication portion, an input portion and a processing portion. The communication portion performs a transmission job which transmits data. The input portion receives, at the time of performance of the transmission job, an input of a symbol sequence obtained by adding command information to a transmission destination address. The processing portion identifies a portion indicating the transmission destination address of and a portion indicating the command information of the symbol sequence input at the time of performance of the transmission job, changes a setting value on the transmission job according to the command information and makes the communication portion transmit data to a transmission destination corresponding to the transmission destination address.

DETAILED DESCRIPTION

An image forming apparatus including a data transmission device according to an embodiment of the present disclosure will be described below using, as an example, an image forming apparatus (multifunctional machine) that can perform a plurality of types of jobs such as a copy job, a transmission job (scan job) and a box job. The box job means a job that stores image data in a storage region previously registered and called a box and that performs printing based on the stored image data.

(Overall Configuration of the Image Forming Apparatus)

Figure 1:
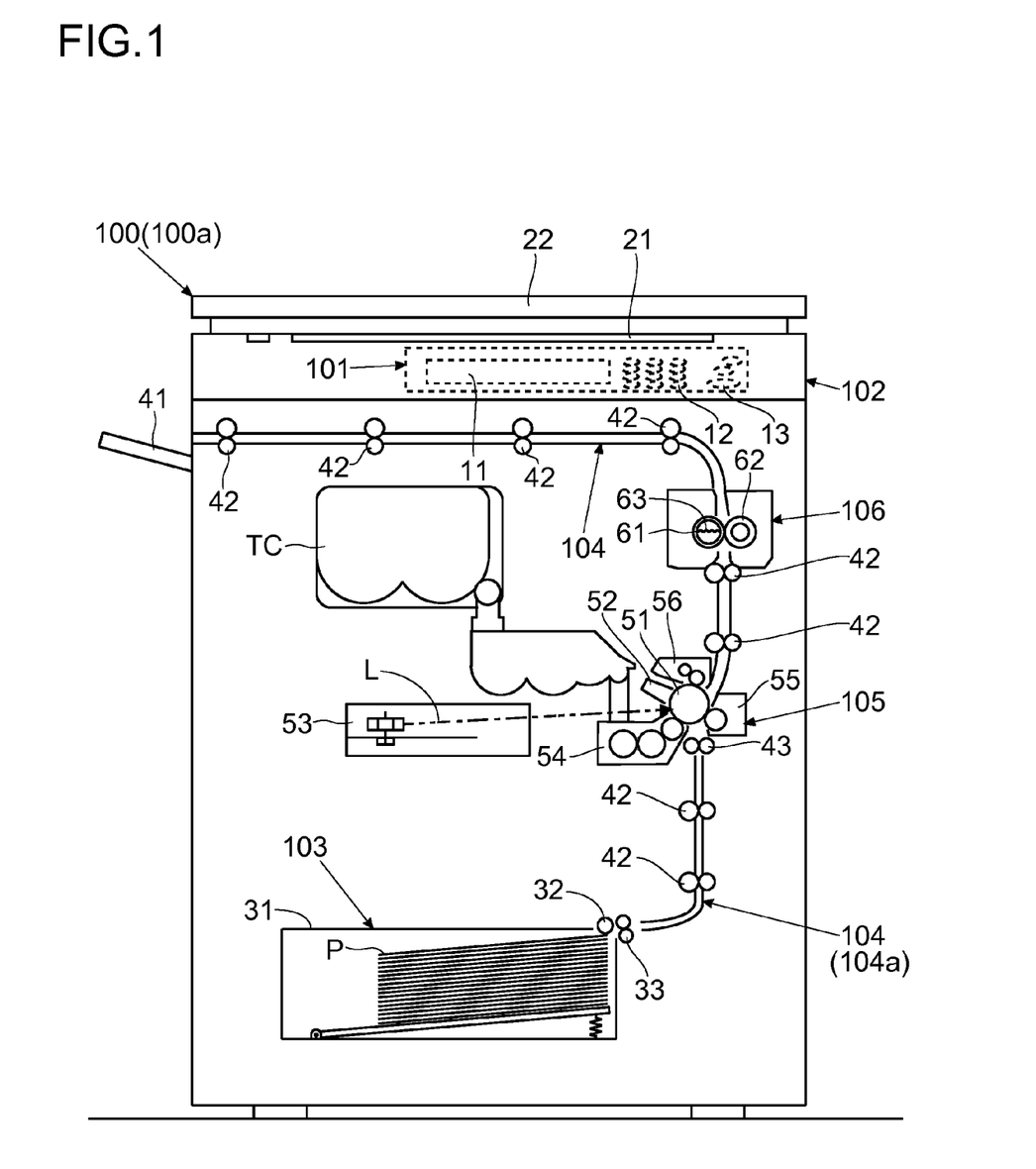
FIG. 1 is a diagram of the overall configuration of an image forming apparatus including a data transmission device according to an embodiment of the present disclosure.

As shown in FIG. 1, the image forming apparatus 100 having the data transmission device 100a of the present embodiment includes an operation panel 101, an image reading portion 102, a paper feed portion 103, a sheet transport portion 104, an image formation portion 105 and a fixing portion 106. The operation panel 101 corresponds to an "input portion" and a "notification portion" according to the present disclosure.

The operation panel 101 includes a liquid crystal display portion 11 (which corresponds to a "display portion" according to the present disclosure) whose display surface is covered by a touch panel. In the liquid crystal display portion 11, setting keys (soft keys) for receiving various types of settings are displayed, and a message indicating the state of the image forming apparatus 100 is also displayed. In the operation panel 101, as hard keys, a numeric keypad 12 for receiving an input of numerical values and a start key 13 for receiving the start of various types of jobs and the like are provided.

The image reading portion 102 reads an original document to generate image data on an image to be formed. In the image reading portion 102, although not shown in the figure, optical system members such as an exposure lamp, a mirror, a lens and an image sensor are provided. The image reading portion 102 applies light to the original document placed on a placement reading contact glass 21, and subjects an output value of the image sensor receiving the light reflected off the original document to A/D conversion, and thus the image data is generated. In this way, it is possible to perform printing based on the image data obtained through an operation of reading (scanning) the original document by the image reading portion 102. It is also possible to store the image data obtained by the scanning. In the image reading portion 102, an original document pressing member 22 for pressing the original document placed on the placement reading contact glass 21 may be provided.

The paper feed portion 103 has a cassette 31 that holds sheets P, and feeds the sheet P within the cassette 31 to the sheet transport portion 104 (sheet transport passage 104a). In the paper feed portion 103, in order to feed, one by one, the sheets P within the cassette 31 to the sheet transport portion 104 (sheet transport passage 104a), a pickup roller 32 for picking up the sheet P within the cassette 31 and a separation roller pair 33 for reducing the simultaneous transport of multiple sheets P and the like are provided.

The sheet transport portion 104 transports the sheet P along the sheet transport passage 104a leading from the cassette 31 to an ejection tray 41. The sheet transport portion 104 includes a plurality of transport roller pairs 42 arranged along the sheet transport passage 104a. The sheet P fed from the paper feed portion 103 passes through the image formation portion 105 and the fixing portion 106 in this order by the rotation of the transport roller pairs 42 and is guided to the ejection tray 41. The sheet transport portion 104 includes a registration roller pair 43 that is arranged in a position (position immediately in front of the image formation portion 105) on an upstream side of the image formation portion 105 in a sheet transport direction. The registration roller pair 43 places the sheet P on standby immediately in front of the image formation portion 105, and feeds out the sheet P to the image formation portion 105 with appropriate timing.

The image formation portion 105 forms a toner image based on the image data on the image to be formed, and transfers the toner image to the sheet P. The image formation portion 105 includes a photosensitive member drum 51, a charging device 52, an exposure device 53, a development device 54, a transfer roller 55 and a cleaning device 56.

In the formation process of and the transfer process of the toner image, the photosensitive member drum 51 is first driven to be rotated, and the surface of the photosensitive member drum 51 is charged by the charging device 52 so as to have a predetermined potential. The exposure device 53 outputs a light beam L based on the image data to be formed to scan and expose the surface of the photosensitive member drum 51. Thus, an electrostatic latent image is formed on the surface of the photosensitive member drum 51. The development device 54 receives toner from a toner container TC, feeds the toner to the electrostatic latent image formed on the surface of the photosensitive member drum 51 and develops the image.

The transfer roller 55 presses onto the surface of the photosensitive member drum 51 and rotates. Then, with appropriate timing, the registration roller pair 43 makes the sheet P enter between the transfer roller 55 and the photosensitive member drum 51. Here, a predetermined voltage is applied to the transfer roller 55. Thus, the toner image on the surface of the photosensitive member drum 51 is transferred to the sheet P. When the transfer process of the toner image is completed, the cleaning device 56 removes the toner and the like left on the surface of the photosensitive member drum 51.

The fixing portion 106 heats and pressurizes the toner image transferred to the sheet P, and thereby fixes it. The fixing portion 106 includes a heating roller 61 and a pressurization roller 62. The heating roller 61 incorporates a heater 63. The pressurization roller 62 presses on the heating roller 61. Then, the sheet P to which the toner image has been transferred passes between the heating roller 61 and the pressurization roller 62, and is thereby heated and pressurized. In this way, the toner image is fixed to the sheet P, and the printing is completed. Thereafter, the sheet P on which the printing has been performed is fed to the ejection tray 41 by the transport roller pairs 42.

(Hardware Configuration of the Image Forming Apparatus)

Figure 2:
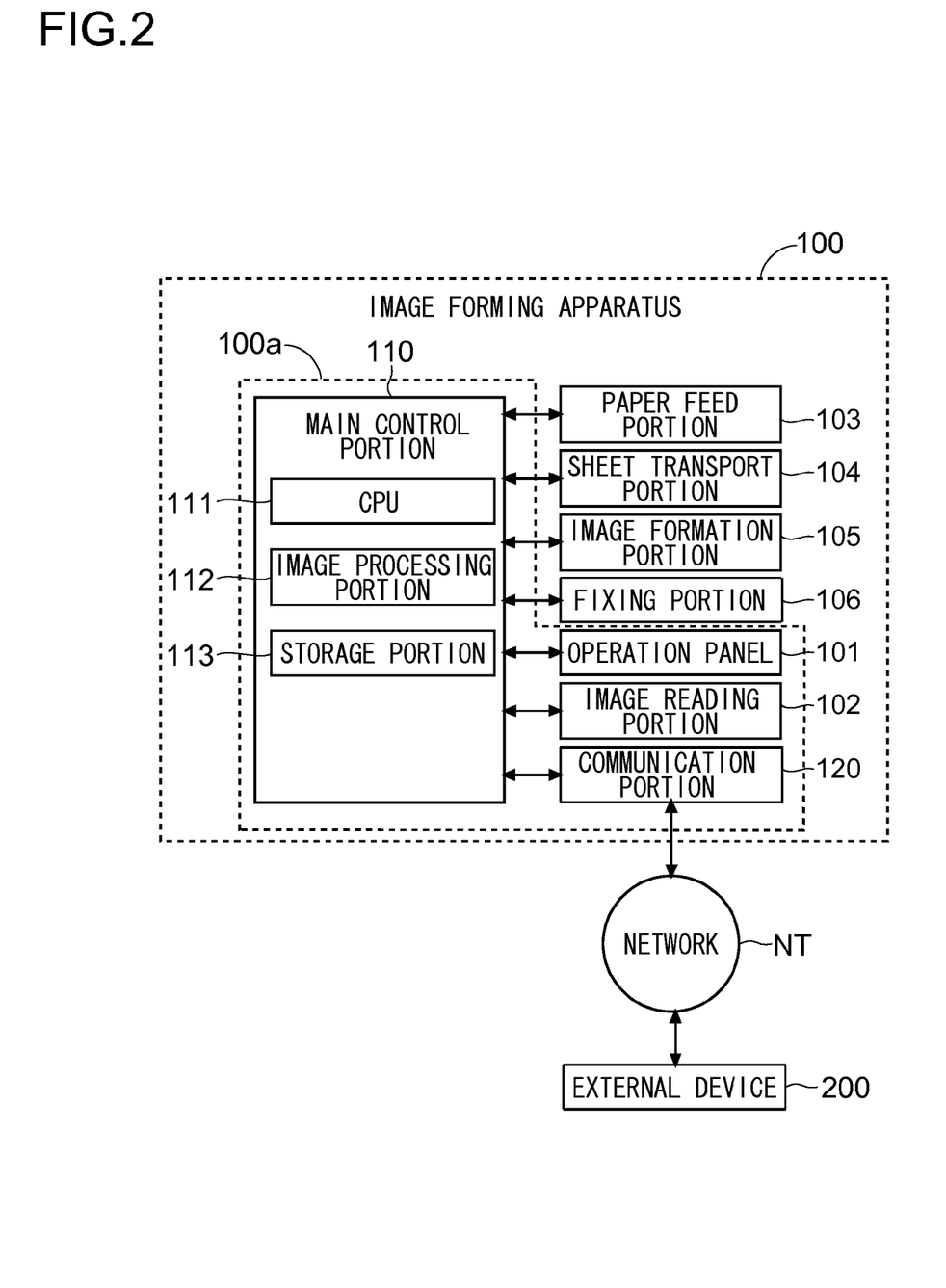
FIG. 2 is a block diagram for illustrating the hardware configuration of the image forming apparatus shown in FIG. 1.

As shown in FIG. 2, the image forming apparatus 100 includes a main control portion 110. The main control portion 110 corresponds to a "processing portion" according to the present disclosure. The main control portion 110 includes a CPU 111 that is a central processing unit, an image processing portion 112 and a storage portion 113. The image processing portion 112 is formed with an ASIC designed specifically for image processing, a memory and the like, and performs various types of image processing (such as enlargement/reduction, density conversion and data format conversion) on the image data. The storage portion 113 is formed with a ROM, a RAM, a HDD and the like; for example, a program and data necessary for the performance of jobs are stored in the ROM, and the program and the data are developed over the RAM.

The main control portion 110 is connected to the operation panel 101, the image reading portion 102, the paper feed portion 103, the sheet transport portion 104, the image formation portion 105 and the fixing portion 106. Then, the main control portion 110 performs, based on the program and the data stored in the storage portion 113, overall control, image processing control, display control, drive control on a motor for rotating various types of rotary members, detection based on the outputs of various types of sensors and the like.

The main control portion 110 is also connected to a communication portion 120. The communication portion 120 performs the transmission job 120. Specifically, the communication portion 120 receives an instruction from the main control portion 110, accesses a transmission destination address through a network NT and transmits data such as the image data to an external device 200 corresponding to the transmission destination address. For example, the communication portion 120 transmits the image data obtained by the scanning and the image data stored in the box to the external device 200, and performs facsimile communication with the external device 200. The external device 200 is, for example, a personal computer, a server or a facsimile.

In this configuration, the operation panel 101, the image reading portion 102, the main control portion 110 and the communication portion 120 function as the data transmission device 100*a*.

(Change of the Setting Value on the Transmission Job)

As the setting items in which, when the transmission job is performed, the setting values can be changed, for example, there are various items such as an original document size, an original document set direction, frame deletion, a file format (compression rate), a transmission size, a reading density, a reading resolution, sharpness and a color mode. A display time of a status screen (screen showing the condition of the performance of the transmission job) displayed on the operation panel 101 after the start of the transmission job also corresponds to the setting value on the transmission job. In order to receive the change of the setting values on these setting items, the main control portion 110 instructs, when the transmission job is performed, the operation panel 101 to receive an input of the setting values on the transmission job.

Figure 3:
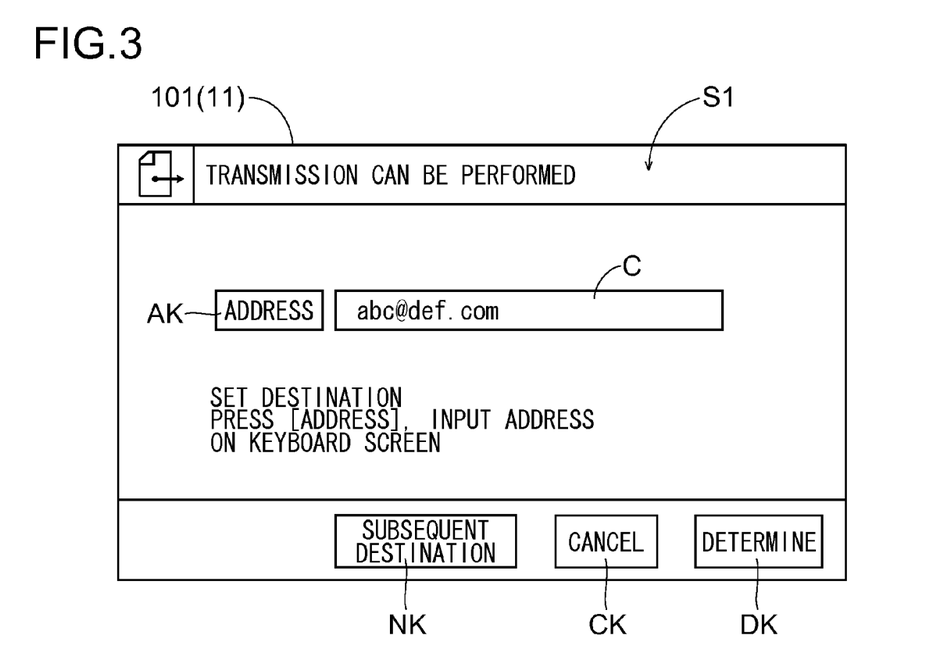
FIG. 3 is a diagram showing an example of a screen (address input screen) displayed on the operation panel of the image forming apparatus shown in FIG. 1.
Figure 4:
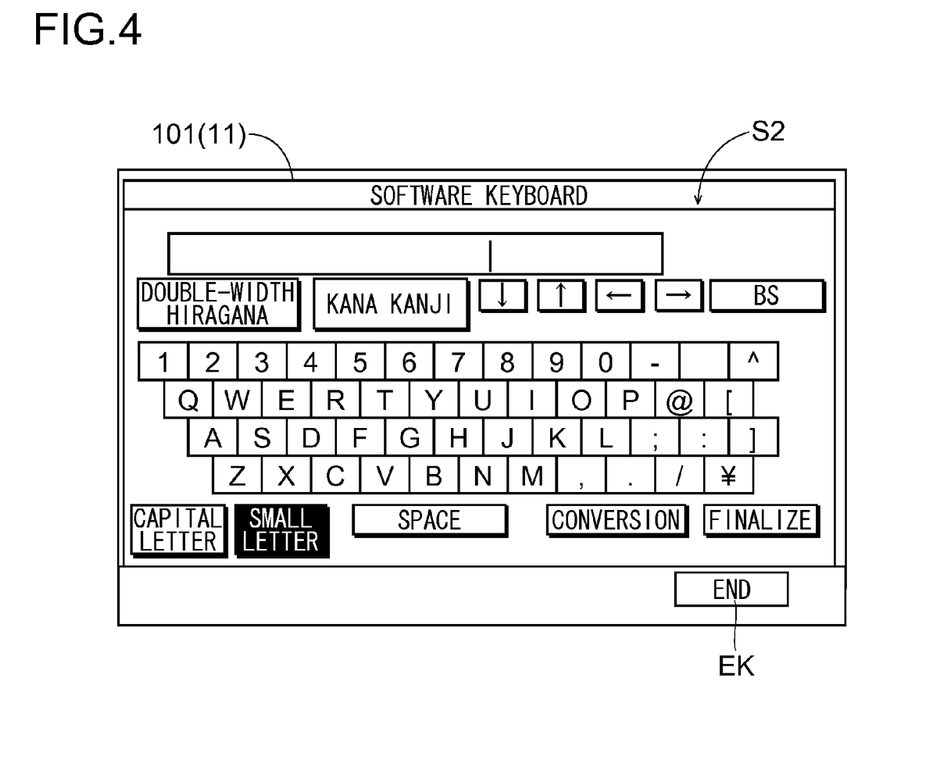
FIG. 4 is a diagram showing an example of a screen (keyboard screen) displayed on the operation panel of the image forming apparatus shown in FIG. 1.

Specifically, when the transmission job is performed, the operation panel 101 first displays, as shown in FIG. 3, an address input screen S1 for inputting the transmission destination address. On the address input screen S1, an address key AK for displaying a software keyboard is arranged. When the address key AK is touched, the operation panel 101 displays, as shown in FIG. 4, a keyboard screen S2 on which the software keyboard is arranged. Thus, the user operates the software keyboard, and thereby can input a symbol sequence of the transmission destination address. Then, when an end key EK is touched while the keyboard screen S2 is being displayed, the operation panel 101 switches the display screen to the address input screen S1 shown in FIG. 3. Here, if the transmission destination address is input onto the keyboard screen S2 (see FIG. 4), the operation panel 101 displays the input transmission destination address in an input box C. FIG. 3 shows, as an example, a case where a transmission destination address "abc@def.com" is input. The user touches a key NK called "subsequent destination", and thereby can continuously input another transmission destination address.

Figure 5:
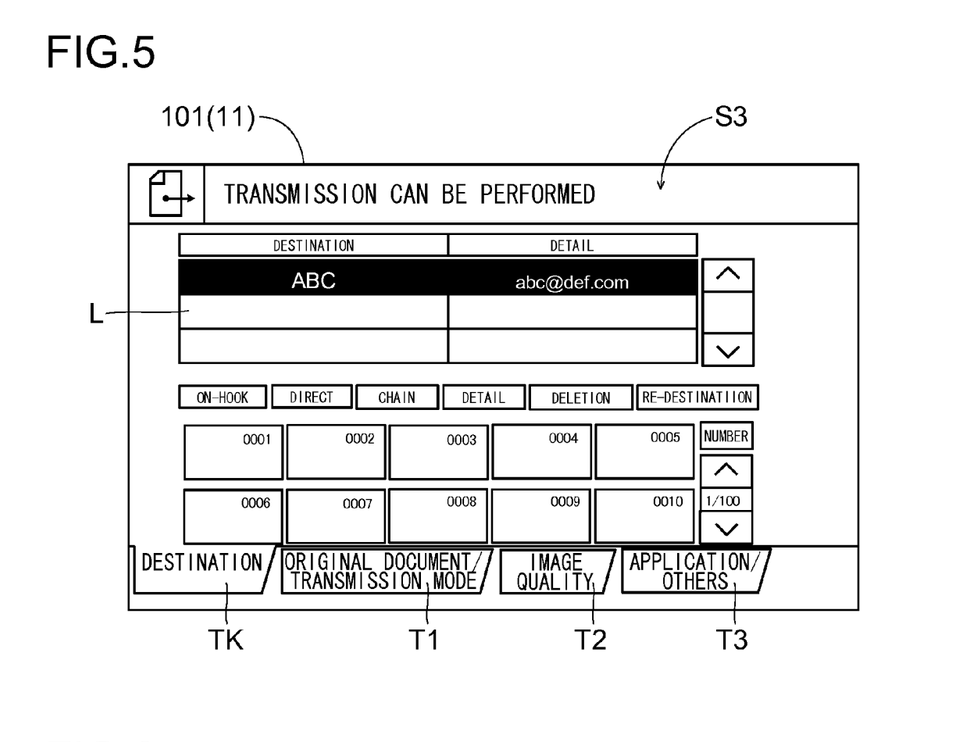
FIG. 5 is a diagram showing an example of a screen (setting screen on a transmission job) displayed on the operation panel of the image forming apparatus shown in FIG. 1.

After the transmission destination address is input onto the address input screen S1, when a determination key DK is touched, the operation panel 101 displays a setting screen S3 as shown in FIG. 5. On the setting screen S3, a list L in which an input transmission destination address is listed is arranged. Although FIG. 5 shows a case where only one transmission destination address is listed up, if there are a plurality of input transmission destination addresses, the plurality of transmission destination addresses are listed up.

Figure 6:
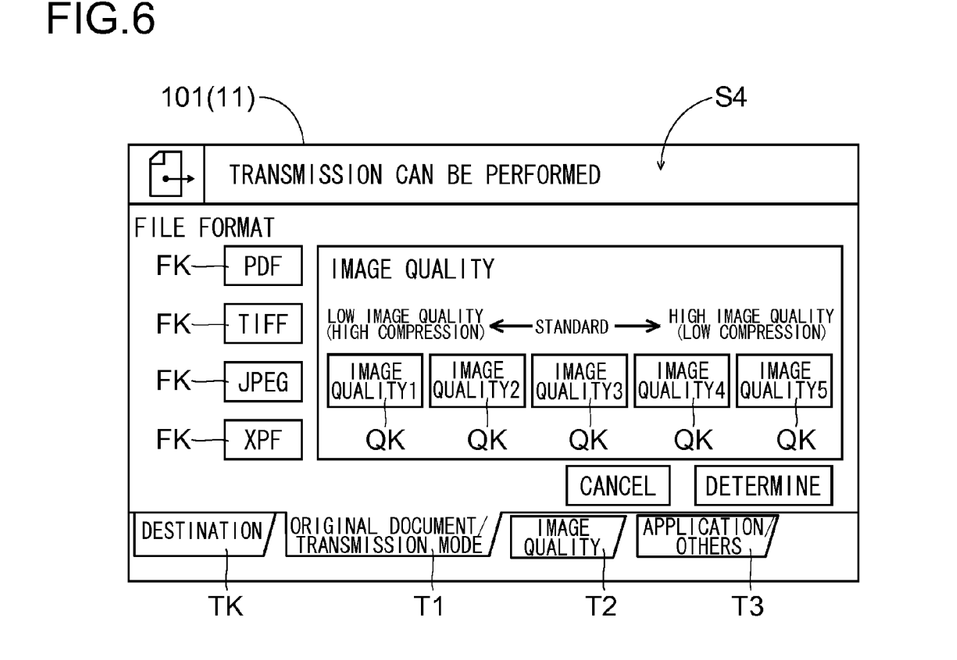
FIG. 6 is a diagram showing an example of a screen (setting value input screen) displayed on the operation panel of the image forming apparatus shown in FIG. 1.

It is possible to transfer from the setting screen S3 to a screen for changing the setting value on the transmission job. For example, on the setting screen S3, a plurality of tab keys T1 to T3 are arranged. When any one of the tab keys T1 to T3 is touched, the operation panel 101 displays a setting value input screen (for example, a setting value input screen S4 shown in FIG. 6) for changing the setting value. FIG. 6 shows, as an example, the setting value input screen S4 for changing the setting value of the file format of the image to be transmitted.

For example, when the user wants to change the setting value of the file format of the image to be transmitted, the user touches the tab key Time T1 to perform an operation for displaying the setting value input screen S4 as shown in FIG. 6. The operation panel 101 receives this operation, and displays the setting value input screen S4. On the setting value input screen S4, file format setting keys FKs for setting the file format (for example, PDF format) and image quality setting keys QKs for setting the image quality (compression rate) are arranged. Thus, the user can set the file format and the image quality (compression rate) of the image to be transmitted.

With reference back to FIG. 5, when the tab key T2 is touched, the operation panel 101 displays a setting value input screen (not shown) for changing the setting values on the image quality such as the reading density and the resolution. When the tab key T3 is touched, the operation panel 101 also displays a setting value input screen (not shown) associated with the tab key T3. When the tab key TK is touched, the operation panel 101 switches the display screen to the setting screen S3 shown in FIG. 5.

As described above, after the input of the transmission destination address, the user performs the operation for transferring from the setting screen S3 to the setting value input screen (for example, the setting value input screen S4 shown in FIG. 6), and thereby can change the current setting value on the transmission job to the desired setting value. However, this is inconvenient for the user because: in order to change the setting value on the transmission job, it is necessary to look for the soft key (or the hard key) for switching the display screen and perform the operation for switching the display screen many times.

Hence, in the present embodiment, when the transmission destination address is input onto the address input screen S1 (see FIG. 3), it is possible to change the setting value on the transmission job. In other words, in the present embodiment, it is possible to change the setting value on the transmission job without performing the input operation on the setting value input screen (for example, the setting value input screen S4 shown in FIG. 6). When the setting value on the transmission job is changed, it is also possible to switch the display screen to the setting value input screen.

Specifically, in the present embodiment, when the transmission job is performed, the operation panel 101 receives an input of a symbol sequence obtained by adding command information (a command for changing the setting value on the transmission job) to the transmission destination address. Then, the main control portion 110 identifies a portion indicating the transmission destination address of and a portion indicating the command information of the symbol sequence input when the transmission job is performed, changes the setting value on the transmission job according to the command information and makes the communication portion 120 transmit data to the transmission destination corresponding to the transmission destination address. An example of the command information will be described below.

For example, a symbol sequence "IMGFMT; PDF; Q3" corresponds to the command information. Of the symbol sequence constituting the command information, a symbol sequence of IMGFMT is a symbol sequence (hereinafter referred to as a command symbol sequence) indicating that the setting value of the file format is specified as a change target. A symbol sequence of PDF is a symbol sequence (hereinafter referred to as a parameter symbol sequence) indicating that the setting value of the file format is changed to the "PDF format"; a symbol sequence of Q3 is a parameter symbol sequence indicating that the setting value of the file format (image quality) is changed to "image quality 3 (standard image quality)." The command symbol sequence and the parameter symbol sequence are divided by a symbol ";". If there are a plurality of parameter symbol sequences, the parameter symbol sequences are divided by the symbol ";".

As another example, a symbol sequence "STATDISP-TIME; 180" corresponds to the command information. Of the symbol sequence constituting the command information, a symbol sequence of STATDISPTIME is a command symbol sequence indicating that the setting value of the display time of the status screen is specified as a change target. A symbol sequence of 180 is a parameter symbol sequence indicating that the setting value of the display time of the status screen is changed to "180 seconds."

The command information described above is an example; for another setting value, it is possible to make a change by inputting the corresponding command information. As long as the symbols constituting the command information can be input to the operation panel 101, any symbol can be used; the type of symbol is not particularly limited. Specifically, the command information may be formed with characters alone; the command information may be formed with numbers alone; the command information may be formed with a mixture of characters and numbers.

The above-described symbol sequence obtained by adding the command information to the transmission destination address is input when the transmission job is performed, and thereafter the main control portion 110 changes, by the touching of the determination key DK (see FIG. 3) on the address input screen S1, the setting value on the transmission job according to the command information.

Here, if predetermined identification information formed with one or a plurality of symbols is included in a symbol sequence input when the transmission job is performed, the main control portion 110 determines that, when the transmission job is performed, the symbol sequence obtained by adding the command information to the transmission destination address is input. For example, the main control portion 110 recognizes that a symbol sequence "@@" is the identification information. The main control portion 110 recognizes that, of the symbol sequence input when the transmission job is performed, a portion input before the identification information is the transmission destination address, and that a portion input after the identification information is the command information.

Figure 7:
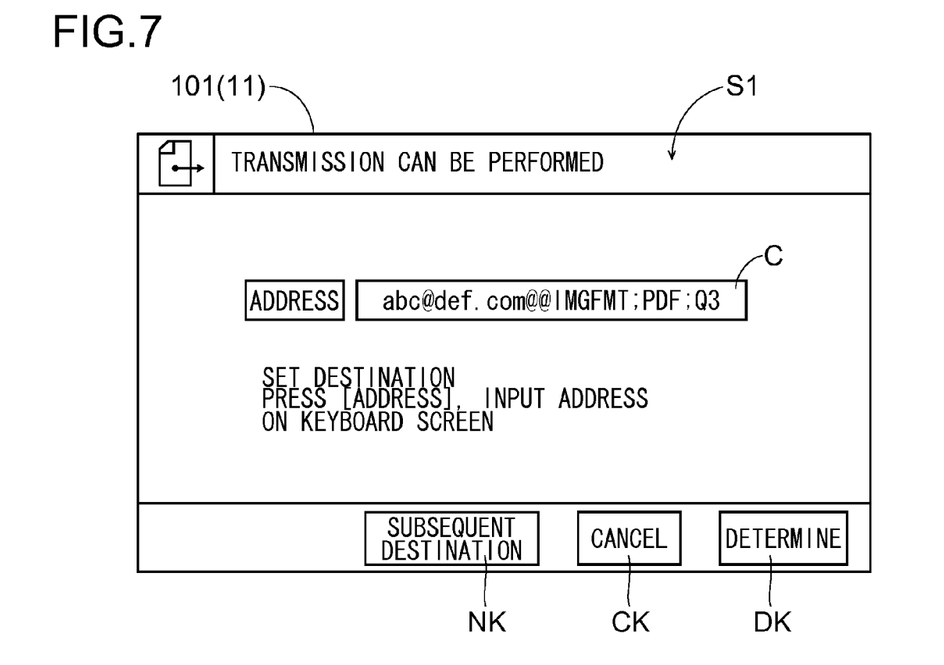
FIG. 7 is a diagram when command information is input onto the address input screen shown in FIG. 3.

In this way, the user can change, when the transmission job is performed, the setting value on the transmission job without performing the input operation on the setting value input screen (for example, the setting value input screen S4 shown in FIG. 6). For example, preferably, when it is desired to convert data to be transmitted into the PDF format of the standard image quality and to perform the transmission job, as shown in FIG. 7, the transmission destination address (abc@def.com) is input, thereafter the identification information (@@) is input and then the command information (IMGFMT; PDF; Q3) is input. In other words, when the transmission job is performed, a symbol sequence "abc@def.com@@ IMGFMT; PDF; Q3" is preferably input. If the display time of the status screen indicating the condition of the performance of the transmission job is desired to be changed to 180 seconds, when the transmission job is performed, a symbol sequence "abc@def.com@@ STATDISPTIME; 180" is preferably input.

Figure 8:
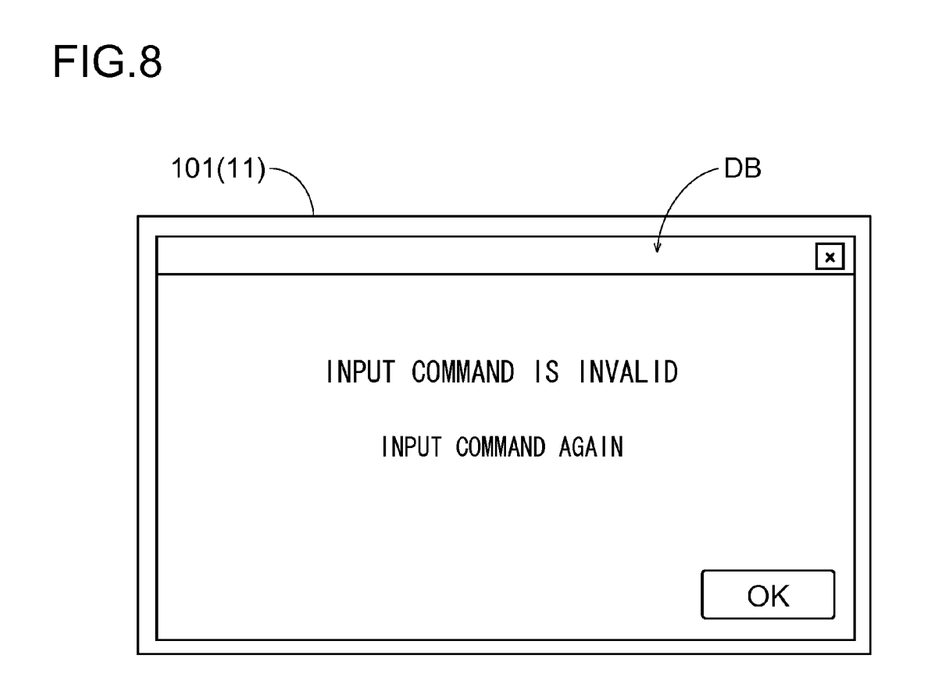
FIG. 8 is a diagram showing an example of an error message displayed when the command information input onto the address input screen shown in FIG. 3 is invalid.

Incidentally, when the command information is input, the command information (the command symbol sequence and the parameter symbol sequence) may be erroneously input. Hence, if the command information input when the transmission job is performed is invalid, the main control portion 110 instructs the operation panel 101 to provide a notification that the command information is invalid. For example, as shown in FIG. 8, the operation panel 101 displays a message indicating that the command information is invalid or a dialog box DB in which a message prompting the user to input the command information again is arranged.

(Flow when the Setting Value on the Transmission Job is Changed)

Figure 9:
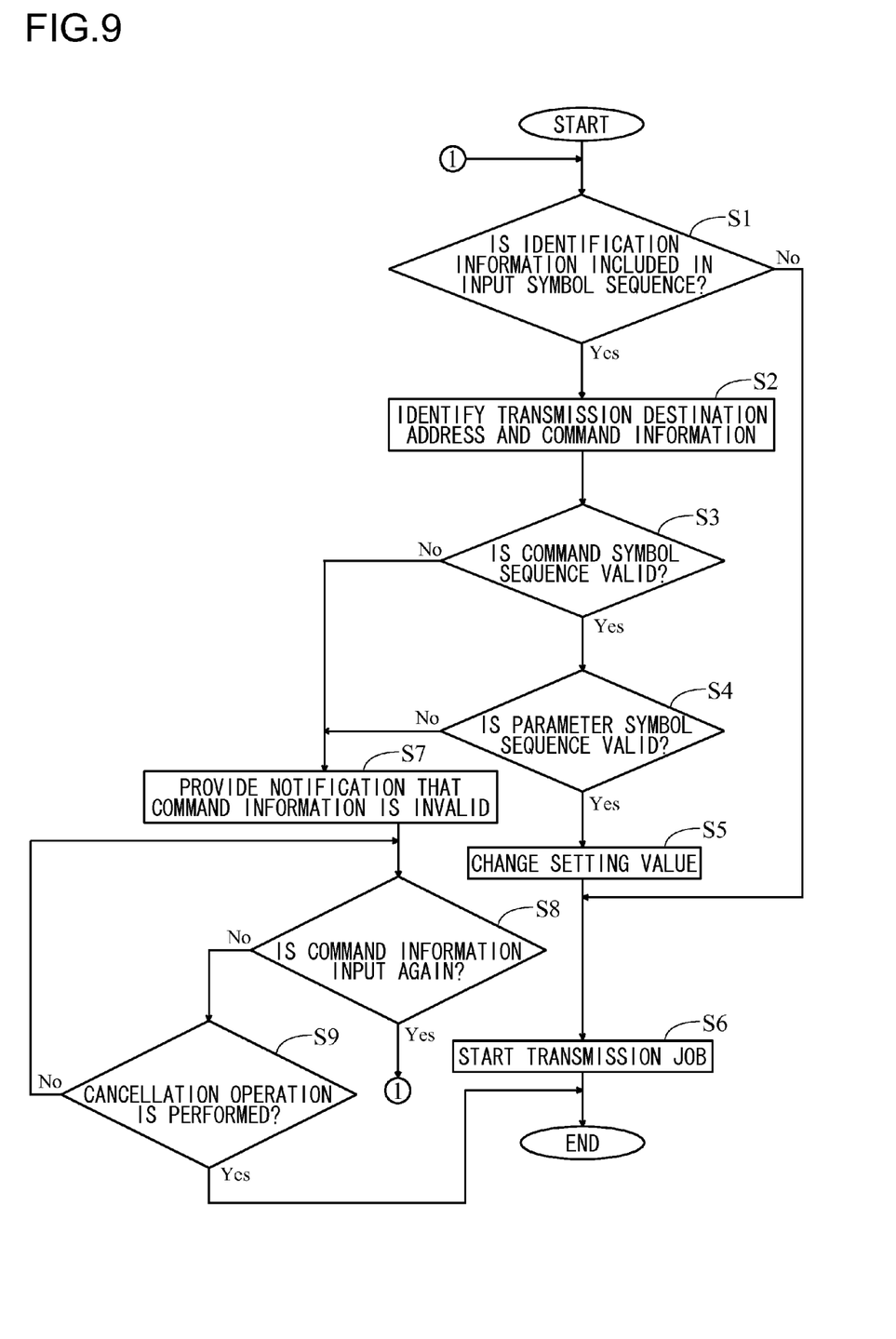
FIG. 9 is a flowchart for illustrating an operation when a setting value on the transmission job is changed in the image forming apparatus shown in FIG. 1.

A flow when the setting value on the transmission job is changed will be described below with reference to the flowchart shown in FIG. 9. First, at the start of the flowchart of FIG. 9, when the user performs the transmission job, the address input screen S1 (see FIG. 3) is assumed to be opened. Then, after the symbol sequence is input onto the address input screen S1, and the determination key DK on the address input screen S1 is touched, when an instruction to start the transmission job is received (when the start key 13 (see FIG. 1) is pressed down), the flowchart of FIG. 9 is started.

In step S1, the main control portion 110 determines whether or not the symbol sequence input when the transmission job is performed includes the identification information. In other words, the main control portion 110 determines whether or not the symbol sequence obtained by adding the command information to the transmission destination address is input when the transmission job is performed. As a result of the determination, if the identification information is included, the process moves to step S2. When the process moves to step S2, the main control portion 110 identifies the portion indicating the transmission destination address of and the portion indicating the command information of the symbol sequence input when the transmission job is performed. Specifically, the main control portion 110 recognizes that, of the symbol sequence input when the transmission job is performed, the portion input before the identification information is the transmission destination address, and that the portion input after the identification information is the command information.

In step S3, the main control portion 110 determines whether or not the command symbol sequence is valid. As a result of the determination, if the command symbol sequence is valid, the process moves to step S4. When the process moves to step S4, the main control portion 110 determines whether or not the parameter symbol sequence is valid. As a result of the determination, if the parameter symbol sequence is valid, the process moves to step S5.

When the process moves to step S5, the main control portion 110 changes the setting value on the transmission job according to the command information. Then, in step S6, the main control portion 110 instructs the communication portion 120 to start the transmission job. In other words, the communication portion 120 transmits data to the transmission destination corresponding to the transmission destination address. In step S1, if the symbol sequence input when the transmission job is performed does not include the identification information, the process also moves to step S6. In this case, the transmission job is started without any change in the setting value on the transmission job.

In step S3, if the command symbol sequence is invalid, the process moves to step S7. In step S4, if the parameter symbol sequence is invalid, the process also moves to step S7. When the process moves to step S7, the main control portion 110 instructs the operation panel 101 to provide a notification that the command information is invalid. For example, the user is prompted to input the command information again. Then, in step S8, the main control portion 110 determines whether or not the command information is input again onto the address input screen S1 (whether or not the determination key DK on the address input screen S1 is touched again). As a result of the determination, if the command information is input again, the process moves to step S1.

On the other hand, in step S8, if the command information is not input again, the process moves to step S9. When the process moves to step S9, the main control portion 110 determines whether or not a cancellation operation is performed. For example, the main control portion 110 determines whether or not a cancel key CL (see FIG. 3) on the address input screen S1 is touched. As a result of the determination, if the cancellation operation is performed, the transmission job is completed without being started whereas, if the cancellation operation is not performed, the process moves to step S8.

As described above, the image forming apparatus 100 (the data transmission device 100a) of the present embodiment includes: the communication portion 120 that performs the transmission job for transmitting the data; the operation panel 101 (the input portion) that receives, when the transmission job is performed, the input of the symbol sequence obtained by adding the command information to the transmission destination address; and the main control portion 110 (the processing portion) that identifies the portion indicating the transmission destination address of and the portion indicating the command information of the symbol sequence input when the transmission job is performed, that changes the setting value on the transmission job according to the command information and that makes the communication portion 120 transmit the data to the transmission destination corresponding to the transmission destination address.

In the image forming apparatus 100 (the data transmission device 100a) configured as described above, when the transmission destination address is input at the time of the performance of the transmission job, the command information is simply input together with the transmission destination address (the command information is added to the transmission destination address), and thus it is possible to change the current setting value on the transmission job to the desired setting value. In this way, when the setting value on the transmission job is changed, the operation of switching the display screen to the setting value input screen (for example, the setting value input screen S4 shown in FIG. 6) is not needed, and it is possible to remove a bothersome operation of looking for the hard key or the soft key for switching the display screen to the setting value input screen, with the result that it is possible to simplify the operation of changing the setting value on the transmission job (it is possible to rapidly complete the change of the setting value on the transmission job). Consequently, the user convenience is enhanced. In other words, by simplifying the operation of changing the setting value on the transmission job, it is possible to enhance the user convenience.

In the present embodiment, as described above, if the predetermined identification information formed with one or a plurality of symbols is included in the symbol sequence input when the transmission job is performed, the main control portion 110 determines that, when the transmission job is performed, the symbol sequence obtained by adding the command information to the transmission destination address is input. Then, the main control portion 110 recognizes that, of the symbol sequence input when the transmission job is performed, the portion input before the identification information is the transmission destination address, and that the portion input after the identification information is the command information. In this way, after the transmission destination address is input, the identification information is input, then the command information is input and thus the transmission destination address is properly identified, with the result that a transmission error (for example, an error in which the transmission destination is not found) is prevented from occurring.

In the present embodiment, as described above, if the command information input when the transmission job is performed is invalid, the operation panel 101 (the notification portion) provides a notification that the command information is invalid. In this way, it is possible to reduce, even if the command information input when the transmission job is performed is invalid, the performance of the transmission job without the current setting value on the transmission job being changed to the desired setting value.

In the present embodiment, as described above, the image reading portion 102 that reads the original document to generate the image data is provided, and the communication portion 120 transmits the image data obtained through reading by the image reading portion 102 to the transmission destination corresponding to the transmission destination address. Thus, it is possible to reduce the number of operations when the image data obtained through reading by the image reading portion 102 is transmitted to the external device 200.

It should be considered that the embodiment disclosed herein is illustrative in all respects and not restrictive. The scope of the present disclosure is indicated not by the description of the above embodiment but by the scope of claims; furthermore, meanings equivalent to the scope of claims and all modifications within the scope are included.

What is claimed is:

1. A data transmission device comprising:
a communication portion that performs a transmission job which transmits data;
an input portion that receives, at a time of performance of the transmission job, an input of a symbol sequence obtained by adding command information to a transmission destination address; and
a processing portion that identifies a portion indicating the transmission destination address of and a portion indicating the command information of the symbol sequence input at the time of performance of the transmission job, that changes a setting value on the transmission job according to the command information and that makes the communication portion transmit data to a transmission destination corresponding to the transmission destination address;
wherein, when predetermined identification information formed with one or a plurality of symbols is included in the symbol sequence input at the time of performance of the transmission job, the processing portion determines that, at the time of performance of the transmission job, the symbol sequence obtained by adding the command information to the transmission destination address is input; and
wherein, the processing portion recognizes that, of the symbol sequence input at the time of performance of the transmission job, a portion input before the identification information is the transmission destination address, and that a portion input after the identification information is the command information.

2. The data transmission device of claim 1,
wherein, when the identification information is not included in the symbol sequence input at the time of performance of the transmission job, the processing portion makes the communication portion transmit the data to the transmission destination corresponding to the transmission destination address without changing the setting value on the transmission job.

3. The data transmission device of claim 1, further comprising:
a notification portion that provides, when the command information input at the time of performance of the transmission job is invalid, a notification that the command information is invalid.

4. The data transmission device of claim 3,
wherein the notification portion includes a display portion, and
when the command information input at the time of performance of the transmission job is invalid, the display portion displays a message that the command information is invalid.

5. The data transmission device of claim 4,
wherein, when the command information input at the time of performance of the transmission job is invalid, the display portion displays a message that inputting of the command information again is encouraged.

6. The data transmission device of claim 1, further comprising:
an image reading portion that reads an original document to generate image data,
wherein the communication portion transmits the image data obtained through the reading by the image reading portion to the transmission destination corresponding to the transmission destination address.

7. An image forming apparatus comprising the data transmission device of claim 1.

* * * * *